UNITED STATES PATENT OFFICE 2,013,584

PROCESS OF MAKING WRITING PENCIL LEADS

Erich Schwanhausser, Nuremberg, Germany

No Drawing. Application November 19, 1931, Serial No. 576,221. In Germany November 24, 1930

1 Claim. (Cl. 106—5)

Hitherto the manufacture of leads for ink pencils, copying pencils and coloured pencils was effected with employment of a binding agent which is made plastic with water. These unburnt leads attract moisture in moist weather, particularly when the temperature is high as well, and, therefore, above all in tropical countries and also in the course of transport to these countries, and as a result lose their strength and hardness, and even very often become soft and flexible and so limited in use. If the leads are glued up in wood then after absorbing water they very often cause the wood casing to fracture. On the other hand if the wood casing is not damaged in any way and the lead therein dries again, shrinking at the same time after giving up the water, then the lead is contained loosely in the wooden casing or else it breaks into pieces. For this reason all the ink-, copying-, and coloured-pencils heretofore known have been of only very limited utility in tropical countries. The masses used in the production of coloured pencils are frequently saturated with fat in such a way that they do not absorb as much water as the ink and copying pencils.

The subject of this invention is a process for removing the faults hitherto attached to these coloured, ink and copying pencils. The process consists above all in this that during the production of leads binding agents are used which are not affected by water and, therefore, either cannot absorb water at all right from the start or else possess this property after having been worked up with the other substances used for making the pencil.

For making coloured, ink and copying pencils according to the invention, the following binding agents are more particularly used:—

Cement, lime, resin soaps or the like which take up water, but are unaffected by moisture after setting and, therefore, no longer hygroscopic;

Casein, glue, gelatin, water-soluble cellulose derivatives or the like, also albumen-like substances, such as albumen, which take up water, but which can be made insensitive towards water by a subsequent process such as chemical treatment with formaldehyde or heat treatment;

Resins, artificial resins, cellulose derivatives, mixtures containing cellulose derivatives, or the like, which are plastic in the hot but become solid in the cold and are unaffected by moisture;

Solutions or swollen masses of cellulose and derivatives thereof, rubber derivatives, resins, artificial resins or the like in solvents, or mixtures of such solutions e. g. with tricresyl phosphate and other materials, which after evaporation of the solvent become solid and insensitive towards moisture;

Rubber, vulcanite or the like which become soft in the hot, swell or dissolve in organic solvents, or which become solid after working up by a hardening process e. g. vulcanization, and are rendered insensitive towards water;

Drying and semi-drying oils and products which become solid after working up by an oxidation process and are unaffected by water.

The said substances or the like are incorporated in the usual manner with the other substances used for making the coloured, ink and copying leads and the whole, after shaping, is then either merely dried or hardened by the said process. The resulting leads are no longer hygroscopic, they do not attract water at all or only in extremely small quantities and as a result they are forthwith adapted for use in tropical countries.

The usual black-lead pencil leads as is well known are made from a mixture of graphite and clay and this mixture is then submitted to a burning process. If the binding media mentioned for producing coloured, ink and copying leads are used for making these black-lead pencil leads, then the clay is superfluous. The use of clay makes the lead disagreeably hard and scratchy. These disagreeable properties do not arise when the said substances are used. Furthermore, the whole burning process is superfluous. It is obvious that as a result the manufacture of leads for black-lead pencils is cheapened and furthermore, their quality is raised.

What I claim is:—

A process for making writing pencil leads which are non-hygroscopic and unaffected by water, consisting in incorporating with the ingredients of the pencil lead a binding agent selected from the groups consisting of casein, gelatin, glue, water-soluble cellulose derivatives, shaping the mixture, and subjecting the shaped product to chemical treatment with a formaldehyde substance for the purpose of hardening the admixed binding agent into a water-insensitive form.

ERICH SCHWANHAUSSER.